United States Patent
Haddad et al.

(10) Patent No.: US 8,942,377 B2
(45) Date of Patent: Jan. 27, 2015

(54) TRUST DISCOVERY IN A COMMUNICATIONS NETWORK

(75) Inventors: Wassim Haddad, San Jose, CA (US); Rolf Blom, Jarfalla (SE); Mats Naslund, Bromma (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 208 days.

(21) Appl. No.: 13/578,356

(22) PCT Filed: Feb. 12, 2010

(86) PCT No.: PCT/SE2010/050167
§ 371 (c)(1),
(2), (4) Date: Aug. 10, 2012

(87) PCT Pub. No.: WO2011/099904
PCT Pub. Date: Aug. 18, 2011

(65) Prior Publication Data
US 2012/0322413 A1 Dec. 20, 2012

(51) Int. Cl.
*H04L 12/06* (2006.01)
*H04W 12/06* (2009.01)
*H04L 29/06* (2006.01)

(52) U.S. Cl.
CPC ........... *H04W 12/06* (2013.01); *H04L 63/0823* (2013.01)
USPC .............................. 380/247; 713/189; 455/411

(58) Field of Classification Search
USPC ............................. 713/161; 455/411; 380/247
See application file for complete search history.

(56) References Cited

U.S. PATENT DOCUMENTS

| | | | |
|---|---|---|---|
| 8,103,718 B2 * | 1/2012 | O'Shea et al. | 709/203 |
| 8,504,660 B2 * | 8/2013 | DeCusatis et al. | 709/220 |
| 8,601,604 B2 * | 12/2013 | Norrman et al. | 726/30 |
| 2006/0072759 A1 | 4/2006 | Gundavelli et al. | |
| 2010/0185847 A1 * | 7/2010 | Shasha et al. | 713/150 |
| 2010/0217985 A1 * | 8/2010 | Fahrny et al. | 713/169 |

FOREIGN PATENT DOCUMENTS

| | | |
|---|---|---|
| EP | 1912376 A1 | 4/2008 |
| WO | 2009139673 A1 | 11/2009 |
| WO | 2011099904 A1 | 8/2011 |

OTHER PUBLICATIONS

Office Action issued on Feb. 3, 2014 in corresponding Japanese application No. 2012-552833, 2 pages.

(Continued)

*Primary Examiner* — Amare F Tabor
(74) *Attorney, Agent, or Firm* — Rothwell, Figg, Ernst & Manbeck P.C.

(57) ABSTRACT

A method and apparatus to establish trust between two nodes in a communications network. A first node receives from a network node authentication data unique to the first node, which can be used to derive a compact representation of verification data for the first node. The first node also receives a certified compact representation of verification data of all nodes in the network. The first node derives trust information from the authentication data for the node, and sends to a second node a message that includes the trust information and part of the authentication data. The second node has its own copy of the certified compact representation of verification data of all nodes in the network, and verifies the authenticity of the message from the first node using the compact representation of verification data of all nodes in the network and the received trust information and authentication data.

16 Claims, 5 Drawing Sheets

(56) References Cited

OTHER PUBLICATIONS

Japanese Office Action dated May 9, 2014 (Final Rejection) JP Application No. 2012-552833, Applicant: Telefonaktiebolaget L M Ericsson (Publ), Title: Trust Discovery in a Communications Network, 4 pages.

English Report Letter dated May 23, 2014 regarding Japanese Office Action (Final Rejection), JP Application No. 2012-552833, Applicant: Telefonaktiebolaget L M Ericsson (Publ), Title: Trust Discovery in a Communications Network, 6 pages.

* cited by examiner

TRUST DISCOVERY IN A COMMUNICATIONS NETWORK

CROSS-REFERENCE TO RELATED APPLICATION

This application is a 35 U.S.C. §371 National Phase Entry Application from PCT/SE2010/050167, filed Feb. 12, 2010, and designating the United States.

TECHNICAL FIELD

The invention relates the field of trust discovery in a communications network.

BACKGROUND

A wireless ad hoc network is a, to a certain extent, decentralized wireless network. Terminals in the network communicate between themselves using the same or a similar radio interface as they would use to communicate with a base station. This is sometimes referred to as "direct mode" communication. A fully ad hoc wireless network does not need to rely on the existing infrastructure of the network, such as the base stations and so on. Instead, each node participates in routing by forwarding data for other nodes, and so the determination of which nodes forward data is made dynamically based on the network connectivity. In a slightly more controlled ad hoc network, the terminals can communicate both directly with one another, and/or use the existing network infrastructure. This could be viewed as an ad hoc network with some support from an infrastructure. Typically a wireless ad hoc network has a limited range when using direct mode, e.g. tens or hundreds of meters. A longer range is possible, but may cause problems with interference when both ad hoc (moving) and infrastructure based (fixed) nodes use the same spectrum.

FIG. 1 shows three example ad hoc network scenarios. FIG. 1a shows network controlled local break-out, in which terminal 1 contacts the network infrastructure 2 in order to initiate communication with terminal 3. FIG. 1b shows a "relay" scenario in which the terminals 1, 3 establish communication with each other, but only terminal 1 is in communication with the network 2. FIG. 1c shows a true ad-hoc network scenario in which three terminals 1, 3, 4 communicate directly with one another without being in communication with the network infrastructure 2. This scenario is typically preceded by one of the two first scenarios. The following description assumes a Long Term Evolution (LTE) network, but it will be appreciated that the concepts apply to other types of cellular network A degree of trust is required in order for terminals to establish an ad hoc network. This is typically achieved using strong authentication and key exchange, but before this step is taken a fast and mutual "neighbour trust discovery" is required. A terminal (the advertising node) will typically advertise its presence and another terminal (the responding node) may respond. In the absence of a lightweight pre-authentication phase for fast neighbour trust discovery, the two terminals are exposed to denial-of service (DoS) attacks, e.g. unnecessarily draining battery power, when establishing security associations.

An LTE terminal is referred to as User Equipment (UE). In this example, an ad-hoc wireless network is a derivative of a deployed LTE infrastructure. The ad-hoc wireless network allows a set of enabled UEs to sense each other's presence and/or to advertise different types of public and private services without using the LTE infrastructure. In addition, these enabled UEs can constantly sense their surrounding environment, and so can receive advertisements from proximity-based services such as restaurants' menus/offers, public transport time tables and so on. In addition to social activities, these services may include commercial activities, multimedia, proximity-based advertisements, buddy's presence, etc.

Consider the scenario whereby a user (Bob) using UE 1 is advertising willingness to play a game of chess, and an interested user (Alice) using UE 3 detects Bob's advertisement and decides to engage with him in a game of chess. Alice and Bob may be complete strangers and no trust relationship exists between then or their UEs. The first step is for Alice to initiate a "neighbour trust discovery" protocol, which enables both Alice and Bob to mutually check each others' legitimacy. Once this has been completed, more secure authentication, including an exchange of keys, can take place.

In this type of environment, there is no easy way for Alice to check Bob's legitimacy. Furthermore, such an exchange would mean that both UEs are exposed to a DoS attack in the form of spoofed key exchange protocol messages sent by nearby malicious nodes. There is also no way to ensure that the two nodes that started the key exchange are the same than the ones which completed it.

One solution to the problem of neighbour trust discovery is for the network infrastructure to provide each user with a conventional public key certificate. For privacy reasons, these certificates should be short-lived, carrying a "pseudonym" rather than a long term identity. This would cause large overhead in the network since the network needs to certify all public keys. It would also imply overhead on the terminals, as each terminal would potentially need to store (or acquire, when needed) the certificates of all other nodes, or all least all other nodes with which the terminal may establish an ad-hoc network.

SUMMARY

The inventors have realised the problems associated with neighbour trust discovery, and have devised a secure and efficient way to enable nodes to perform neighbour trust discovery prior to connection establishment and key exchange, whilst minimizing the risk of a DoS attack.

According to a first aspect of the invention, there is provided a method to establish trust between two nodes in a communications network. A first node receives from a network node authentication data unique to the first node. The authentication data can be used to derive a compact representation of verification data for the first node. The first node also receives a certified compact representation of verification data of all nodes in the network. When the first node wishes to set up an ad-hoc network with a second node, it derives trust information from the authentication data for the node, and sends to the second node a message that includes the trust information and at least a part of the authentication data. The second node has its own copy of the certified compact representation of verification data of all nodes in the network, and verifies the authenticity of the message from the first node using the compact representation of verification data of all nodes in the network and the received trust information and authentication data. As both nodes have received the certified compact representation of verification data from the network, they can establish a degree of trust before a key exchange without having to further communicate with the network.

As an option, the compact representation of the verification data of the first node comprises a root of a Merkle Tree that has been derived from the authentication data unique to the first node and a plurality of reference times relative to a base reference time within a predetermined time period. By using reference times, the second node can also use times to assist in verifying the authenticity of the message.

As a further option, the compact representation of verification data of all nodes in the network comprises one of a Bloom Filter and a root of a Merkle tree derived from the verification data of all nodes in the networks.

The method optionally comprises, at the first node, deriving a leaf of a Merkle tree from the authentication data unique to the first node and a single reference time derived from information obtained from a clock at the first node, wherein the trust information is derived from the derived leaf. This allows the second node to verify the authenticity of the message using information derived from a clock at the second node. The second node optionally verifies the authenticity of the message from the first node by deriving a leaf of a Merkle tree from the authentication data and a reference time derived from information obtained from a clock at the second node, verifying the trust information, deriving a second compact representation of verification data of the first node, and verifying that the second compact representation of verification data of the first node accords with the compact representation of verification data of all nodes in the network.

As a further option, the compact representation of verification data of all nodes in the network comprises a Bloom Filter, and the second compact representation of verification data of the first node accords with the compact representation of verification data of all nodes in the network if the second compact representation of verification data is indicated as a member of the Bloom Filter. Alternatively, the compact representation of verification data of all nodes in the network comprises a root of a Merkle Tree derived from verification data of all nodes in the network, and the second compact representation of verification data of the first node accords with the compact representation of verification data of all nodes in the network if the root of the Merkle Tree can be derived from the second compact representation of verification data of the first node.

In order to improve security further, the method optionally further comprises the first node receiving from the network node a group key available to all network nodes belonging to a group, and the first node encrypting at least part of the message using the group key prior to sending it to the second node. In this way, part of the message can be encrypted and only accessed by other members of the group.

The message is optionally sent in response to a query from the second node, the query from the second node having been sent in response to an advertising message sent by the first node.

According to a second aspect of the invention, there is provided a mobile communications node for use in a communications network. The node comprises a receiver for receiving from a network node authentication data unique to the node from which a compact representation of verification data for the node can be derived, and a compact representation of verification data of all nodes in the network, the compact representation of verification data of all nodes in the network being certified by the network node. The node is also provided with a processor for deriving trust information from the authentication data, and a transmitter for sending to a second node the trust information and at least a part of the authentication data. The trust information is usable by the second node to verify the authenticity of the message using the compact representation of verification data of all nodes in the network and the received trust information and authentication data.

The mobile communications node optionally further comprises a clock, wherein the processor is arranged to derive a leaf of a Merkle tree from the authentication data unique to the node and a single reference time derived from information obtained from the clock, wherein the trust information is derived from the derived leaf.

As an option, the mobile communications node further comprises a memory for storing a group key, wherein the processor is arranged to encrypt at least part of the message using the group key prior to sending it to the second node.

The compact representation of the verification data optionally comprises a root of a Merkle Tree, the Merkle tree having been derived from the authentication data unique to the node and a plurality of reference times relative to a base reference time within a predetermined time period. As a further option, the compact representation of verification data of all nodes in the network comprises one of a Bloom Filter and a root of a Merkle tree derived from the authentication data of all nodes in the networks.

According to a third aspect of the invention, there is provided a mobile communications node for use in a communications network. The node is provided with a receiver for receiving from a network node a compact representation of verification data of all nodes in the network certified by the network node. A memory is provided for storing the received compact representation of verification data of all nodes in the network certified by the network node. The receiver is further arranged to receive from an advertising node a message, the message including authentication data and trust information derived from authentication data for the advertising node. A processor is provided for verifying the authenticity of the message using the compact representation of verification data of all nodes in the network, the received trust information and the received authentication data for the advertising node.

The mobile communications node is optionally provided with a clock, wherein the processor is arranged to verify the trust information by comparing it with information derived from a leaf of a Merkle tree, the leaf being derived from the authentication data and information derived from a time obtained from the clock, the processor being further arranged to derive a second compact representation of verification data of all nodes in the network and verifying if said second compact representation of verification data of all nodes accords with the stored compact representation of verification data of all nodes in the network.

According to a fourth aspect of the invention, there is provided a network node for use in a communications network. The network node comprises a processor for deriving, for each of a plurality of nodes associated with the communications network, authentication data unique to each node, and a certified compact representation of verification data of all nodes in the network. A transmitter is also provided for sending to each of the plurality of nodes the authentication data unique to each node, and the certified compact representation of verification data of all nodes in the network.

According to a fifth aspect of the invention, there is provided a computer program, comprising computer readable code which, when run on a mobile communications node, causes the mobile communications node to behave as a mobile communications node as described above in any of the second or third aspects of the invention.

According to a sixth aspect of the invention, there is provided a computer program, comprising computer readable code which, when run on a network node, causes the network node to behave as a network node as described above in the fourth aspect of the invention.

According to a seventh aspect of the invention, there is provided a computer program product comprising a computer readable medium and a computer program as described above in the fifth or sixth aspects of the invention, wherein the computer program is stored on the computer readable medium.

DETAILED DESCRIPTION

Figure 1:
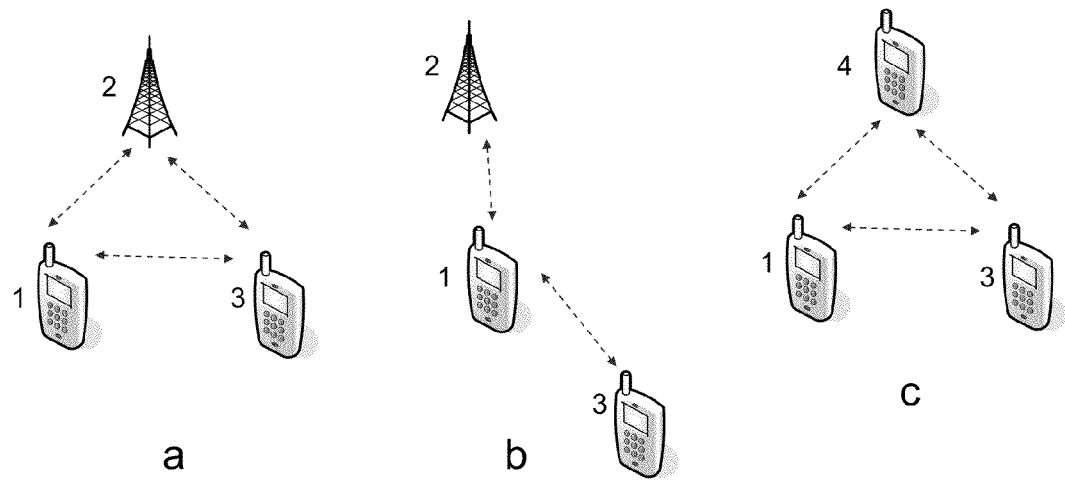
FIG. 1 illustrates schematically in a block diagram example network scenarios.

The following description assumes that each node in a network can communicate with central network nodes or with each other without communicating via the network (to create an ad hoc network). An LTE infrastructure is assumed, although it will be appreciated that a similar method could be used in any type of communications network. The LTE infrastructure is able to reach any ad-hoc enabled node anytime and anywhere using a unicast and/or multicast channel, e.g. "paging" or cell broadcast. It is also assumed that each node has an internal clock, and that they are all time-synchronized. This time synchronization need not be exact if a window mechanism is used.

When a node wishes to form an ad hoc network with another node, it sends an advertisement. The following three categories of advertisement are considered:

"Public" advertisements which refer mainly to business oriented advertisements (e.g., public/private transport, etc)

"Private" advertisements which refer mainly to announcing presence and proximity to a special set of nodes (e.g., between me and my buddies)

"Semi-public" advertisements which refer to social and safety oriented advertisements (e.g., games, medical, social services, vehicular messages, etc)

An UE 1 attaching to an LTE network 2 securely obtains a set of "security parameters", generated by the LTE infrastructure, for example the Mobility Management Entity (MME), which are sent to the UE 1. Security for this transmission would typically be provided by the existing UE-to-network signaling protocols. In a first embodiment, the security parameters are implemented using Merkle Trees. These parameters can be divided into two categories: a set of parameters used to authenticate outgoing advertisements and a (single) parameter used to verify incoming ones. This means that the LTE infrastructure is able to trace any malicious behaviour, such as a DoS attack, back to the sender and take any necessary action (for example banning that user from the network).

A compact representation of the security parameters is sent to each UE in the network. According a first embodiment of the invention, the compact representation is based on Merkle trees, and according to a second embodiment of the invention, a compact representation is based on Bloom Filters. This compact representation is required, as a UE may need to verify advertisements from any other UE. There may be thousands of other UEs in the network, and so a straightforward approach to sending a non-compact representation would consume so much bandwidth as to be impractical.

The method described below is concerned mainly with the semi-public category of advertisements, as the private category mandates its own privacy and security. However, the method may also be applied to the category of public advertisements as it may significantly optimize the use of LTE bandwidth by removing the need to query the infrastructure for each public advertisement.

The method of establishing a trust relationship in an ad hoc network, as described below, is envisaged as acting as an "early" trust mechanism, and is intended to be a precursor to a key exchange protocol. Enabling a quick trust discovery between an advertising and a responding UE ensures that both nodes are protected from a possible DoS attack that could otherwise be launched during the pairing procedure.

If the UEs decide to interact, a pairwise key establishment, for example based on Diffie-Hellman, would typically also take place, following the discovery. This is however outside the scope of the invention. Note though that the invention would be applicable to authenticate transmitted Diffie-Hellman parameters.

Figure 2:
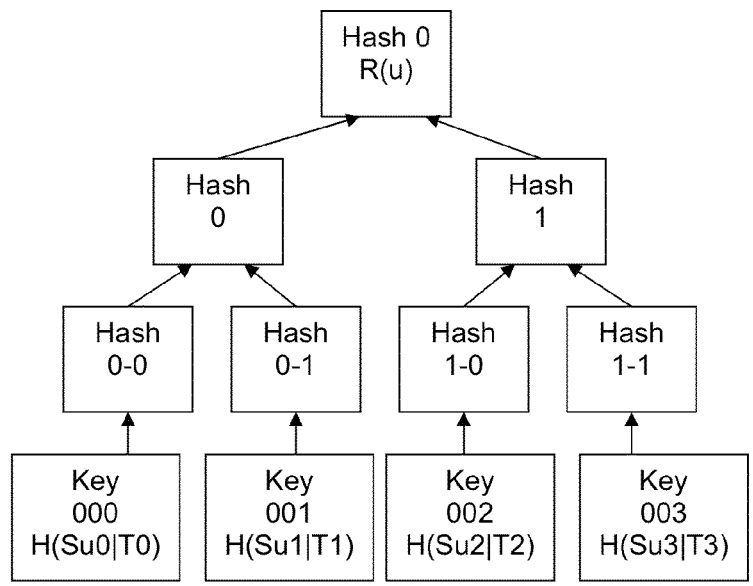
FIG. 2 illustrates schematically a Merkle tree generated from hashed keys.

In order to better describe the first embodiment of the invention, and with reference to FIG. 2, a description of a Merkle tree follows:

A Merkle tree is a labeled binary tree. The labels of the leaves are of form, L1=H(R1), L2=H(R2), ..., Ln=H(Rn) where H is a cryptographic (one-way) hash function (e.g. implemented using the SHA-256 or Whirlpool hash functions) and Rj:s may be any value. The label of an internal vertex, v, is defined recursively from the labels of the to "children", i.e.

$$\text{Label}(v)=H(\text{Label}(\text{left}(v))\|\text{Label}(\text{right}(v)))$$

where left(v) and right(v) correspond to the left/right child of v and || denotes concatenation. The tree may be associated/identified by the label of the root.

Hash functions such as H may be used to authenticate or "sign" single messages. The user publishes the message, m, and H(H(R)||m), where R is some random value. To allow verification, the user reveals R. The verifier checks that R, when hashed with the message according to the above formula, yields the same result. The downside is that only a single message may be signed securely since R is consumed at the instant it is disclosed.

In the example of FIG. 2, a root value Hash 0 is generated from key values Key 000 to Key 003. Each key value is a leaf of the Merkle tree.

Merkle trees allow authentication of several messages. Each leaf can be though of as the "public key" for one message, providing means to authenticate an exponential (in the depth of the tree) number of messages. Note that when using Merkle Trees, the user must not only reveal the leaf, but also the "off-path" siblings along the path from the leaf to the root. There is a logarithmic number (in the size of the tree) of such siblings.

In order to better describe the second embodiment of the invention, a Bloom filter is a bit-vector of a predetermined length, m, together with a set of k hash functions h1, h2, . . . , hk, mapping into the set $\{1, 2, \ldots, m\}$. To insert a data item, x, into the Bloom filter, bit-positions h1(x), h2(x), . . . hk(x) of the bit-vector are all set to "1". Conversely, in order to determine if a certain candidate data item, y, is a member of a data set being encoded by the Bloom filter, bit-positions h1(y), h2(y), . . . hk(y) are checked, and if all these bit-positions are "1", it can be assumed that y is a member of the data set. As a result, Bloom filters can give so-called "false positives" since the bit positions may have been set to "1" by some other element(s), different from y. However, the rate of false positives can be controlled by selecting appropriate values of m and k. For example, a Bloom Filter having a false positive rate $2^{(-t)}$ can be constructed provided that the size of the Bloom Filter is at least $m=1.44 \times t \times N$, where N is the number of elements inserted.

Turning now to the first embodiment of the invention, the MME determines a plurality of time periods with reference to a base time period. For example, assuming that the minimum time period is 6 seconds if the base time period is midnight, each time period of the plurality of time periods is midnight+6 seconds, midnight+12 seconds, midnight+18 seconds and so on. Each time period may be used by a node in sending an advertisement. Each advertisement is assigned two special parameters called authentication data and trust information which is at least partly pre-stored in the advertising node. It follows that a 24 hour period requires 14400 different trust parameters with the above granularity. The number of parameters is referred to as n (n=14400 is the default in this example).

The MME also determines a maximum number, N, of users that is served. For each such user, u=1, 2, . . . N, and each time period, j=1, 2, . . . n the network allocates a (pseudo) random value Suj which serves as the authentication data for the corresponding time period, Tj.

The MME calculates a Merkle tree and certifies it for each legitimate user/UE (e.g. at network attach). Each leaf of the Merkle tree is computed by hashing the random authentication data Suj associated with that UE with each of the 14400 time periods. This means that leaf(j) or Lj=First [128, H(Suj|Tj)], where Suj is the above secret associated with Tj, chosen by the network and which is known also to the user and Tj corresponds to a specific time period. For simplicity, it is assumed that all Tj have the same duration, although it is possible to have Tjs of different durations. This may take account of peak traffic in the network where more Tjs are allowed in a given time period.

Note that in a typical case such as an LTE network, each Suj might be generated from a key, Su, shared between the network and the UE according to e.g. Suj=H(Su, j). Su must then only be made available to the UE and the network, and must not be revealed to other UEs.

A Merkle tree specific to each UE and covering the following 24 hours is generated and stored by the LTE. The LTE network therefore pre-computes R(u), the root of user u's Merkle Tree (before the user connects). This is repeated for all N users. Note that only Su, T0, n and R(u) need to be stored, rather than the entire trees: any internal vertex can be reconstructed, if needed, from T0, n, and Su. This involves O(N*n) hash computations.

At some point in time, the UE 1 connects to an ad-hoc social ecosystem via authenticating and authorization by LTE, during which it securely receives authentication data Suj (or Su) and n from the network. The UE 1 can create the main parameters of its own hash tree, which means that the UE 1 and the LTE network do not need to exchange any specific leaf because they can both generate any of them whenever they are required using T1, n, the shared Su and a one-way hash, H. The UE 1 also receives a single system certificate representing a set of at least all presently connected users. (The certificate can also represent not-yet connected users as described below.) This system certificate is a compact and verifiable representation of all users' Merkle tree roots, explained below.

When the UE 1 wishes to form an ad hoc network with another UE 3 without further involving the network 2, the UE 1 sends an advertisement that includes the authentication data Suj and trust information based on the corresponding leaf, Lj, associated with the current time-interval, Tj, of the transaction. For example, Lj may be used as a key to compute a message authentication code (MAC), e.g. Hash(Lj, message), By sending Suj, (and possibly siblings, as necessary) the receiving UE 3 can compute the root and check its validity via a local copy of the system certificate that the UE 3 has previously received from the network. The receiver does not need to check if the leaf is part of the tree. Instead, it checks if the set of parameters would lead to a root, which is a valid parameter, in other words is certified by the system certificate.

The system certificate should allow the receiving node to verify any node in the network. As described above, it is not desirable to distribute a root associated with each UE registered with the network, as there may be a very high number of them. The network therefore creates a second Merkle Tree using the roots of each registered UE: R(1), R(2), . . . R(N) as input leaves. The root of the system-wide tree is termed R. The network signs R using a conventional signature mechanism, e.g. RSA public key cryptography, and distributes it. For each user u, the network sends information comprising the "off-path" siblings of the path from R(u) to root R. Hence, assuming the number of users is $N=2^t$, each user gets $O(\log N)=O(t)$ additional values. This set is termed Sib(u). Note that as this distribution is unicast from the network to each UE, pre-existing LTE (shared) keys may alternatively be used to "sign" R and this information, instead of using RSA.

Note that the total computational effort of the network to construct R is $O(N*(n+1))$ hash function evaluations: $O(N*n)$ to construct all R(u) and then O(N) to combine them into R.

During a subsequent neighbour trust discovery exchange between two nodes in a wireless ad hoc network, the receiving node must validate the authentication data and trust information sent by the advertising node without communicating with any central network nodes such as an MME. To authenticate an advertisement, an advertising node UE 1 releases a leaf in his tree (associated with the time period, Tj obtained from the UE's 1 internal clock) and the corresponding off-path information leading to the root R(u), i.e. O(d) values where d=log n. The advertising user also sends Sib(u), i.e. O(t) values. A "signature" now has size O(d+t). Note that Sib(u) may be cached for future use if storage space allows.

The number of hash computations that a receiving node UE 3 must make to verify an advertisement is also O(d+t). This is done by first reconstructing R(u), then reconstructing R from R(u) and Sib(u).

It should be noted that the receiving node should also include authentication data and trust information when replying to an advertising message so that both nodes UE 1 and UE 3 can be mutually sure that they are legitimate.

The key exchange protocol between the two nodes UE 1 and UE 3 should encompass the trust displayed during the neighbour trust discovery protocol but it should not disclose any of the nodes' identities. For this purpose, the first two messages required to perform a Diffie-Hellman exchange could be sent in multicast mode and should carry additional parameters that are either generated from the "trust parameters" exchanged between the two nodes or during the neighbour trust discovery exchange.

Figure 3:
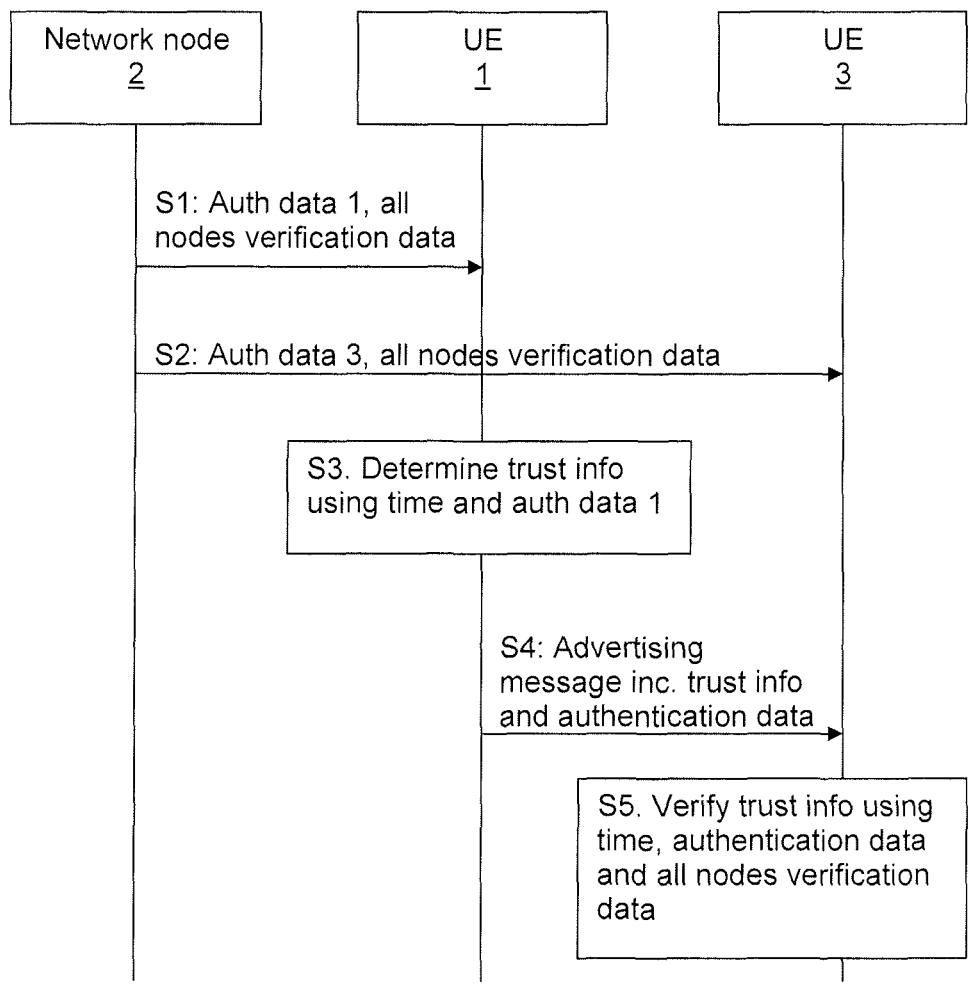
FIG. 3 is a signaling diagram illustrating signaling according to an embodiment of the invention.

Referring to FIG. 3, and with the following numbering corresponding to the numbering of the Figure, the following steps describe an overview of the invention.

S1 and S2: The MME 2 sends to all nodes in the network (including UE 1 and UE 3) authentication data Su (or Suj) relating to each node, and the signed system certificate. This is typically done as each node attaches to the network.

S3. When UE 1 wishes to set up an ad hoc network with another node, it determines trust information comprising the leaf of its Merkle tree Lj associated with the current time Tj and corresponding authentication data Suj determined from its internal clock. The trust information and authentication data is used to authenticate an advertisement, m.

S4. UE 1 sends the trust information and authentication data to UE 3 in an advertisement. The information transmitted thus includes "message", H(Lj, "message"), Suj (i.e. the advertisement itself, and trust information comprising the MAC and the authentication data).

S5. UE 3 verifies the advertisement by computing Lj=H(Suj|Tj), verifying H(Lj, "message") and then determining the Merkle tree root for UE 1, and then determining that root R can be derived from the root for UE 1 and Sib(u).

Figure 4:
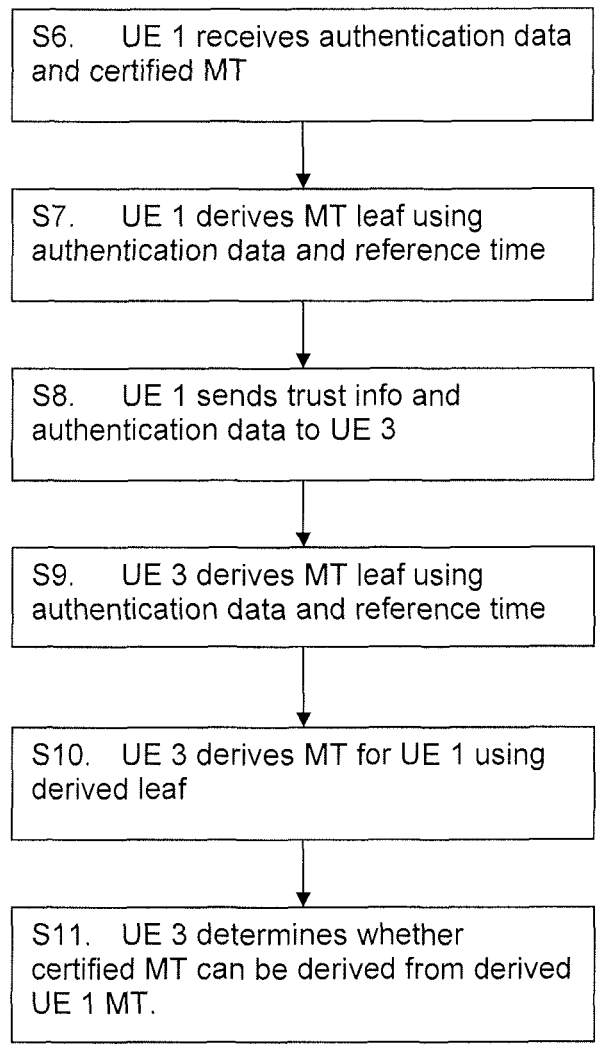
FIG. 4 is a flow diagram illustrating the steps of a first embodiment of the invention.

FIG. 4 shows the first specific embodiment in more detail, with the following numbering corresponding to the numbering of FIG. 4:

S6. UE 1 receives its authentication information (Suj) and the certified Merkle Tree derived from authentication data of all nodes in the network.

S7. UE 1 derives a leaf (Lj) of a Merkle tree using its authentication data (Suj) and a time (Tj) obtained indirectly from its internal clock. The derived leaf Lj s used to derive the remainder of trust information, H(Lj, "message").

S8. UE 1 sends to UE 2 a message including the trust information.

S9. UE 3 derives a leaf of a Merkle Tree using the authentication data and a reference time obtained indirectly from its own internal clock. It will be appreciated that UE 1 and UE 3's internal clocks should be reasonably tightly synchronized, although some differences can be allowed for by UE 3 caching the received message. The remainder of the trust information H(Lj, "message") is also verified.

S10. UE 3 derives a root of a Merkle Tree for the first node using the derived leaf.

S11. UE 3 determines whether the root of the certified Merkle Tree derived from verification data of all nodes in the network can be derived from the root of the Merkle Tree for the first node that it has derived. If so, then the message is verified.

The following examples assume a hash function, H, producing m bit outputs is used, e.g. m=128. The system has N users and n time periods are needed (e.g. n=14400).

System Initialization:

1. The network node 2 (such as an MME) decides on parameters N and n at current time period T1 (or slightly before).

2. For each u=1, 2, . . . , N, the network node 2 chooses a random Su (or pseudo random Suj), constructs R(u) from Su and T1, T2, . . . Tn, and stores Su and R(u)

3. R is determined from R(1), R(2), . . . R(N), and stored

4. The network signs R and sends it to all nodes in the network.

Join

This is executed when a new UE, denoted u, attaches.

1. Normal LTE access security is carried out.

2. The network sends T1, n, Su and R(u) to the UE (about 2m bits) protected by LTE access security. Alternatively, the UE may select Su and send to the network.

3. In an optional embodiment (since the network is assumed to be trusted), the UE may take "samples" to verify that R(u) is properly created, i.e. evaluating some (random) paths from leaves to the root.

4. The network sends Sib(u), the O(log N) off-path siblings of R(u) in R to u (a total of O(m*log N) bits), protected by LTE access security.

5. In an optional embodiment, the UE verifies that R is correct (requiring O(log N) hash computations).

Authenticating an Advertisement

1. The UE 1 derives the correct leaf, Lj, corresponding to Suj and the current time period, Tj.

2. The UE 1 makes an advertisement to UE 3, authenticated by Lj (using Lj as a key for H, thus only one computation of H is needed), the authentication data Suj, and the O(log n) off-path siblings of Lj as well as the O(log N) off-path siblings of R(u). As an alternative to step 2, the UE only sends the message and the MAC. A node UE 3 receiving the advertisement then needs to request authentication data and the siblings from UE 1. In either case, the total communication from the sender before anyone else can verify the (first) advertisement (see next section) is O(m*(1+log n+log N)).

Verifying an Advertisement

1. UE 3 receives a (first) advertisement from UE 1 and obtains authentication data (corresponding to UE 1) and the siblings as discussed above, either as part of the advertisement or by requesting them from UE 1.

2. UE 3 checks that the MAC is correct and that Lj together with the siblings lead to a root R(u), which uses O(1+log n) evaluations of H.

3. If correct, UE 3 verifies that R(u) together with siblings of the (current) system-wide tree, R, leads to the root of R, i.e. O(log N) evaluations of H.

After step 2, the receiving UE may cache R(u) so that if subsequent messages are received within the life time of R(u) and R, only steps 1 and 2 need to be performed.

According to a second specific embodiment, each user, u, has a Merkle Tree which is identified by its root, R(u). The principle is the same as the first embodiment, in that the user reveals leaves and siblings to enable others to compute the path to the root, thereby authenticating advertisements. The difference in the second embodiment lies in the way the "compact representation" of all users' public keys are obtained. In the first specific embodiment, another Merkle Tree for this purpose, whereas in the second specific embodiment, a Bloom Filter is used.

The roots of each users' Merkle Trees {R(1), R(2), . . . , R(u), . . . , R(N)} are inserted into a Bloom Filter. The LTE network signs the Bloom filter, e.g. using RSA. When user wishes to authenticated an advertisement, then, after calculating the (candidate) root R(u) of user u, the verifying user checks if R(u) is a member of the signed system-wide Bloom Filter.

There are some advantages and disadvantages with using a Bloom Filter. First, when the LTE network initializes the system parameters, it does not need to generate Merkle Trees for users that have not yet connected. This is because arbitrary elements may be inserted in the Bloom Filter at a later stage. When a new user is added, the network node updates the Bloom Filter and re-signs it. The system wide Merkle Tree does not have this property owing to the "one-way" nature of the hash function H: leaves cannot be added "afterwards", the tree must be generated leaf-to-root at the outset. Also, verification of advertisement is more efficient using a Bloom Filter as the depth of the trees involved does not depend on the total number of users in the system, but only on the number of advertisements made by each user. In other words, the Merkle Tree embodiments would give rise to trees with a total depth of O(log n+log N) rather than O(log n) when using Bloom Filters. Given the root of user u's Merkle Tree, checking the Bloom Filter is essentially instant. Specifically, assuming the Bloom Filter has k hash functions, checking the Bloom Filter corresponds to k hash computations.

The drawback of the Bloom Filter approach is the false-positive rate of Bloom Filters described above. Even if a root R(u) is not inserted in the Bloom Filter, it may appear to be. This can however be controlled by choosing BF parameters.

The following examples using a Bloom Filter make the same assumptions as those made in describing the first specific embodiment.

System Initialization
1. The network node 2 determines parameter N. Assume the current time period is T1 (or slightly before). The system chooses a Bloom Filter with suitable size and suitable k (based on N and a desired false-positive rate). Bloom Filter is initialized to be empty.
2. The network signs Bloom Filter and starts to send (e.g. broadcast) it to all nodes in the network.

Join
This is executed when a new UE 1, denoted u, attaches.
1. Normal LTE access security is carried out.
2. The UE 1 chooses n leaves and forms a Merkle Tree, R(u), which is sent to the network node 2 protected by LTE access security. (Alternatively, the network node 2 can choose the tree/leaves, e.g. based on Su/Suj values as described above).
3. Optionally the party NOT generating the tree may take samples to verify that R(u) is properly created, i.e. evaluating some (random) paths from leaves to the root.
4. The network adds R(u) to the Bloom Filter, re-signs the Bloom Filter and starts broadcasting the new value.

Authenticating an Advertisement
1. The UE 1 locates the correct authentication data Suj (and thus, the corresponding leaf, Lj), corresponding to current time period, Tj.
2. The UE 1 makes an advertisement, authenticated by Lj (e.g. using Lj as a key for H, thus only one computation of H is needed), the authentication data, and the O(log n) off-path siblings of Li.

As an alternative to step 2, the UE only sends the message and the MAC. A user receiving the advertisement then needs to request authentication data and the siblings. In either case, the total communication from the sender before anyone else can verify the (first) advertisement (see below) is O(m*(1+ log n+log N)).

Verifying an Advertisement
1. A UE 3 receiving a (first) advertisement from UE 1 first needs to obtain authentication data and the siblings as discussed above, either as part of the advertisement or by request from UE 1. The UE 3 is assumed to have a copy of the most recently broadcasted (and signed) Bloom Filter.
2. The receiving UE 3 derives a root R(u) and checks that R(u) is in the broadcasted Bloom Filter, after having checked that the MAC is correct and that Lj together with the siblings lead to the root R(u), which uses O(1+log n) evaluations of H.

After 2, the receiving UE may cache R(u) so that on subsequent messages sent within the life time of R(u) and R, only steps 1 and 2 need to be performed.

Figure 5:
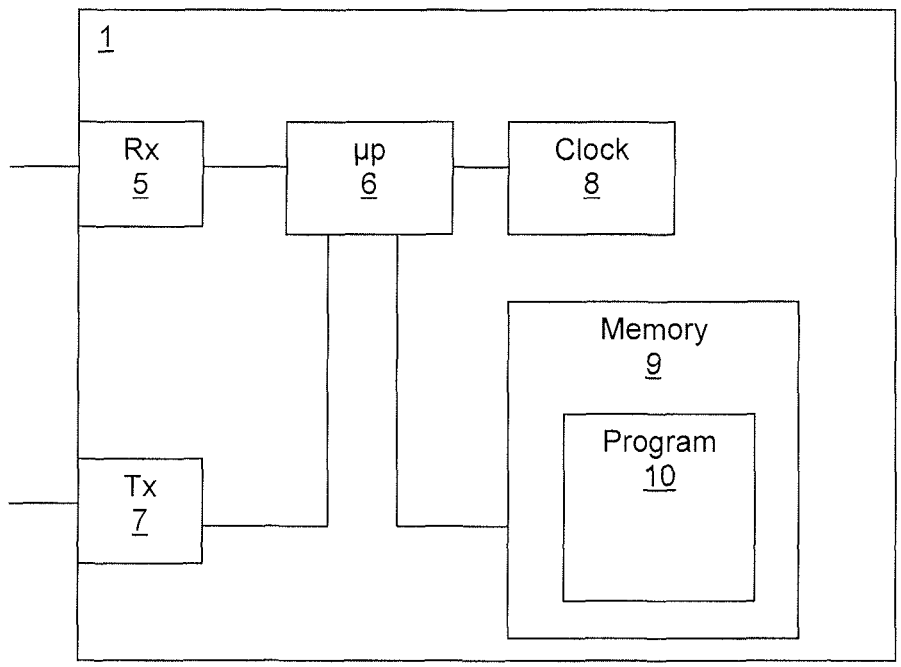
FIG. 5 illustrates schematically in a block diagram an advertising terminal according to an embodiment of the invention.

Turning now to FIG. 5, there is illustrated schematically in a block diagram a UE 1 that sends an advertising message. UE 1 is provided with a receiver 5 for receiving its authentication information and the certified Merkle Tree (or Bloom Filter if the second embodiment is used. For the purposes of this description, a Merkle Tree will be referred to although the skilled person will appreciate that a Bloom Filter as described above could be used). A processor 6 is provided for deriving a leaf of UE 1's Merkle Tree using the authentication data and reference time and to derive the trust information from the leaf. Time is obtained directly or indirectly from a clock 8. A transmitter 7 is provided for sending the trust information and authentication data to UE 3. A memory 9 is provided for storing a group key, in which case the processor 6 is arranged to encrypt at least part of the message using the group key (as described below in the third specific embodiment) prior to sending it to UE 3. The memory 9 may also be used to store a computer program 10 which causes UE 1 to behave as described above.

Figure 6:
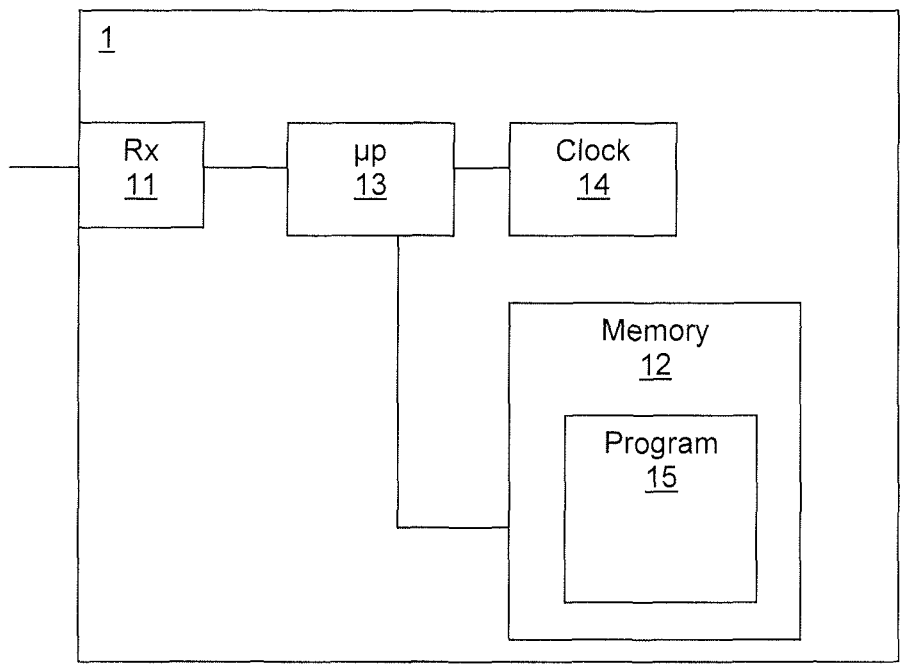
FIG. 6 illustrates schematically in a block diagram a receiving terminal according to an embodiment of the invention.

FIG. 6 shows schematically in a block diagram a receiving node such as UE 3. UE 3 is provided with a receiver 11 for receiving the certified Merkle Tree. This is stored in a memory 12. The receiver 11 is also arranged to receive a message from UE 1 that includes authentication data and the trust information derived. A processor 13 is provided for verifying the authenticity of the message using the certified Merkle Tree and the received authentication data and trust information. A clock 14 is also provided to allow the processor 13 to verify the trust information as described above. The memory 12 may also be used to store a computer program 15 which causes UE 3 to behave as described above.

Figure 7:
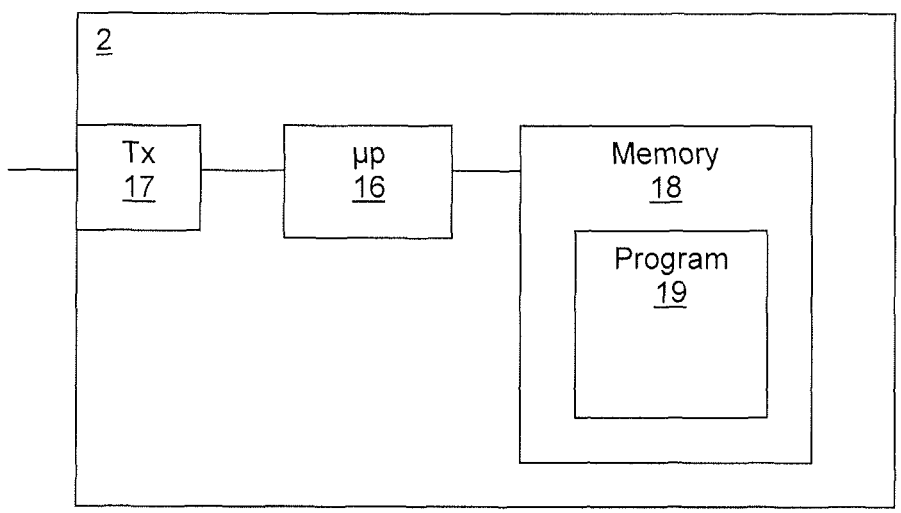
FIG. 7 illustrates schematically in a block diagram a network node according to an embodiment of the invention.

FIG. 7 shows schematically in a block diagram a network node 2 such as a MME. The MME is provided with a processor 16 for deriving and certifying a Merkle Tree (or a Bloom Filter) from authentication data associated with each node in the network. A transmitter 17 is provided for sending the certified Merkle Tree (or Bloom Filter) to each of the plurality of nodes in the network, along with the authentication data unique to each node. A memory 18 may also be provided to store data and a computer program 19 which causes MME to behave as described above.

The following description provides an analysis of the advantages and disadvantages of the two embodiments.

From a security point of view, two "attacks" must be considered.
1. The probability of creating a "faked" user.
2. The probability of faking advertisements on behalf of a legitimate user.

In both embodiments, the probability of attack 2 is determined by the size of the hash functions used in the per-user Merkle Tree and can be made very small, e.g. $2^{(-t)}$ when using t-bit hash functions, e.g. t=128 or 256.

The probability of attack 1, however, depends on whether Merkle Trees or Bloom Filters are used for the compact representation.

When using Merkle Trees, the probability is also dependent on the hash function size, i.e. t. Therefore, it is easy to ensure that attack 1 and 2 have the same (low) probability when using Merkle Trees.

However, when using Bloom Filters, the probability of attack 1 is the same as the false positive rate of the Bloom Filter. In order to bring this down to $2^{(-t)}$, as described above, the Bloom Filter must have size m=1.44*t*N, where N is the number of users. Note that this is worse than the Merkle Tree embodiment which only needs t bits for the single system-wide root. Indeed, this value of m is actually 44% larger than the "trivial" solution of just concatenating all N users' individual Merkle Tree roots since this would lead to size t*N for the "compact" representation. A Bloom Filter smaller than this trivial solution could be achieved at the expense of a false positive rate of $2^{(-t/1.44)}$. For example, with t=128, the false positive rate will be about $2^{(-88)}$. In general, to achieve a c-fold "compression" compared to the trivial solution we will need to accept a false positive rate of $2^{(-t/(1.44*c))}$.

Despite the need to accept a higher probability of attack 1 when using Bloom Filters, the Bloom Filter embodiment still has an advantage in that the verification complexity is independent of the number of users, N, whereas it grows logarithmically with N when using only Merkle Trees. The higher false positive rate may also be acceptable if the solution is complemented by a second (strong, mutual) user authentication phase following the initial authentication of the advertisement.

As described in the first two embodiments, the system is not fully private since a user may be tracked via repeatedly revealing his parameters (e.g. root, R(u)). Although the identity of the user remains unknown, this type of tracking may not be desirable.

According to a third specific embodiment, which is compatible with either of the first or second specific embodiments, a secret key shared may be introduced between all users in a "buddy group" to improve privacy. This key is termed KB and may be chosen by the network node 2 and communicated to users as they attach. It is assumed that the LTE network node 2 knows which groups a user belongs to.

When Bob makes an advertisement, everything is encrypted using KB. Only members of the group can decrypt, but note that they cannot be sure the advertisement was directed to them before trying to reconstruct Bob's tree. Therefore, Bob encrypts not only the root R(u) of his tree but "prefixes" it also by a (un-encrypted) text saying that the message is directed to this buddy group. Each member for the group only needs to decrypt the first part of the message to check if the message is directed to them, and whether there is any point in attempt to reconstruct the tree.

It will be appreciated that when using the third embodiment with the second embodiment, instead of increasing k, several Bloom Filters could be used. In this case, each buddy group has a certificate in the form of a (signed) Bloom filter, but which only contains the Merkle Trees of that particular buddy group.

It will be appreciated by the person of skill in the art that various modifications may be made to the above-described embodiments without departing from the scope of the present invention. In particular, the invention may be applied in any type of communications network. Furthermore, it will be appreciated that whilst the above description uses time obtained from a clock to assist in independently verifying the authenticity of a message sent from the first node, an alternative independent variable may be used.

The following abbreviations are used in the above description:
DoS Denial-of Service
LTE Long Term Evolution
UE User Equipment
MME Mobility Management Entity
CA Certifying Authority

The invention claimed is:

1. A method to establish trust between two nodes in a communications network, the method comprising:

at a first node, receiving from a network node authentication data unique to the first node, from which a compact representation of verification data for the first node can be derived, and a compact representation of verification data of all nodes in the network, the compact representation of verification data of all nodes in the network being certified by the network node;

deriving trust information from the authentication data for the first node; and sending from the first node to a second node, the second node also having received the compact representation of verification data of all nodes in the network, a message, the message including the trust information and at least a part of the authentication data; and at the second node, verifying the authenticity of the message from the first node using the compact representation of verification data of all nodes in the network and the received trust information and authentication data.

2. The method according to claim 1, wherein the compact representation of the verification data of the first node comprises a root of a Merkle Tree, the Merkle tree having been derived from the authentication data unique to the first node and a plurality of reference times relative to a base reference time within a predetermined time period.

3. The method according to claim 1, wherein the compact representation of verification data of all nodes in the network comprises one of a Bloom Filter and a root of a Merkle tree derived from the verification data of all nodes in the networks.

4. The method according to claim 1, comprising at the first node, deriving a leaf of a Merkle tree from the authentication data unique to the first node and a single reference time derived from information obtained from a clock at the first node, wherein the trust information is derived from the derived leaf.

5. The method according to claim 4, wherein the second node verifies the authenticity of the message from the first node by:

deriving a leaf of a Merkle tree from said authentication data and a reference time derived from information obtained from a clock at the second node;

verifying the trust information, deriving a second compact representation of verification data of the first node, and verifying that the second compact representation of verification data of the first node accords with the compact representation of verification data of all nodes in the network.

6. The method according to claim 5, wherein the compact representation of verification data of all nodes in the network comprises a Bloom Filter, and the second compact representation of verification data of the first node accords with the compact representation of verification data of all nodes in the network if the second compact representation of verification data is indicated as a member of the Bloom Filter.

7. The method according to claim 5, wherein the compact representation of verification data of all nodes in the network comprises a root of a Merkle Tree derived from authentication data of all nodes in the network, and the second compact representation of verification data of the first node accords with the compact representation of verification data of all nodes in the network if the root of the Merkle Tree can be derived from the second compact representation of verification data of the first node.

8. The method according to claim 1, further comprising at the first node, receiving from the network node a group key available to all network nodes belonging to a group; and at the first node, encrypting at least part of the message using the group key prior to sending it to the second node.

9. The method according claim 1, wherein the message is sent in response to a query from the second node, the query from the second node having been sent in response to an advertising message sent by the first node.

10. A mobile communications node for use in a communications network, the node comprising:
- a receiver for receiving from a network node authentication data unique to the node from which a compact representation of verification data for the node can be derived, and a compact representation of verification data of all nodes in the network, the compact representation of verification data of all nodes in the network being certified by the network node;
- a processor for deriving trust information from the authentication data; and
- a transmitter for sending to a second node the trust information and at least a part of the authentication data, the trust information usable by the second node to verify the authenticity of the message using the compact representation of verification data of all nodes in the network and the received trust information and authentication data.

11. The mobile communications node according to claim 10, further comprising a clock, wherein the processor is arranged to derive a leaf of a Merkle tree from the authentication data unique to the node and a single reference time derived from information obtained from the clock, wherein the trust information is derived from the derived leaf.

12. The mobile communications node according to claim 10, further comprising a memory for storing a group key, wherein the processor is arranged to encrypt at least part of the message using the group key prior to sending it to the second node.

13. The mobile communications node according to claim 10, wherein the compact representation of the verification data comprises a root of a Merkle Tree, the Merkle tree having been derived from the authentication data unique to the node and a plurality of reference times relative to a base reference time within a predetermined time period.

14. The mobile communications node according to claim 10, wherein the compact representation of verification data of all nodes in the network comprises one of a Bloom Filter and a root of a Merkle tree derived from the authentication data of all nodes in the networks.

15. A mobile communications node for use in a communications network, the node comprising:
- a receiver for receiving from a network node a compact representation of verification data of all nodes in the network certified by the network node;
- a memory for storing the received compact representation of verification data of all nodes in the network certified by the network node;
- the receiver being further arranged to receive from an advertising node a message, the message including authentication data and trust information derived from authentication data for the advertising node; and
- a processor for verifying the authenticity of the message using the compact representation of verification data of all nodes in the network, the received trust information and the received authentication data for the advertising node.

16. The mobile communications node according to claim 15, further comprising a clock, wherein the processor is arranged to verify the trust information by comparing it with information derived from a leaf of a Merkle tree, the leaf being derived from the authentication data and information derived from a time obtained from the clock, the processor being further arranged to derive a second compact representation of verification data of all nodes in the network and verifying if said second compact representation of verification data of all nodes accords with the stored compact representation of verification data of all nodes in the network.

* * * * *